3,529,046
UTILIZING LITHIUM OXIDE AND PRECURSORS AS SINTERING AID FOR HOT PRESSING BERYLLIUM OXIDE

Rudolph Hendricks, Jr., Oak Ridge, Tenn., assignor to the United States of America as represented by the United States Atomic Energy Commission
No Drawing. Filed June 20, 1968, Ser. No. 738,418
Int. Cl. C04b 35/08
U.S. Cl. 264—66      4 Claims

ABSTRACT OF THE DISCLOSURE

High-purity, theoretically dense beryllium oxide products are produced at reduced temperatures and pressures by utilizing a fugitive-type sintering aid and beryllium oxide powder. A mixture of beryllium oxide powder and about 0.5 weight percent lithium oxide, added either as lithium oxide or a precursor of lithium oxide is hot-pressed at a temperature of about 950° C. and a pressure of 1500–2000 p.s.i. to form theoretically dense products. The product may be subsequently heat-treated at about 1000°–1400° C. for removing virtually all the lithium oxide remaining in the product to provide a product of high purity.

---

The present invention relates generally to hot-pressing beryllium oxide products or structures of theoretical density or densities near theoretical, and more particularly to a method of producing such structures at lower pressures and temperatures than previously employed. This invention was made in the course of, or under, a contract with the U.S. Atomic Energy Commission.

Beryllium oxide (beryllia or BeO) enjoys nuclear and physical properties which are highly advantageous in nuclear power and space applications. However, because of the difficulty of fabricating complicated structural components from beryllium oxide with desirable density, purity, and strength characteristics, the employment of this material in such applications has heretofore been somewhat limited.

Previous efforts utilized for the fabrication of beryllium oxide structures of desired densities and close dimensional tolerances for minimizing or obviating the high cost of machining the structures with diamond tooling include hot-pressing techniques as well as cold-pressing techniques followed by a sintering operation. These techniques result in undesirable density gradients unless structures of near theoretical density are obtained. It is also known that beryllium oxide structures produced by hot-pressing techniques are somewhat more desirable and superior in many respects to BeO structures made by practicing cold-pressing and sintering techniques. In some applications, the only means of obtaining densities near or at theoretical density, i.e., 3.0 grams per cubic centimeter, as well as precise dimensions, is by employing a relatively expensive hot-isostatic-pressing operation.

To fabricate beryllium oxide structures of near theoretical density by hot-pressing, the use of sintering aids, high pressures, and temperatures in excess of 1500° C. has heretofore been required. For example, the fabrication of beryllium oxide components having a density of 95 percent theoretical or greater required temperatures of 1500° C. at 1500 p.s.i. while utilizing known sintering aids, e.g., MgO. Without the use of sintering aids, an even higher temperature of 1800° C. and a higher pressure of 4000 p.s.i. are required for producing a product of about 95 percent thoretical density, with the temperature and pressure requirements further increasing for fabricating structures of theoretical density. In addition to the difficulties of producing these high-temperature products, the choice of die materials utilized in the hot-pressing operation is somewhat limited because of the high temperature and pressures necessitated for the fabrication.

It is the aim of the present invention to obviate or substantially minimize the above and other shortcomings or drawbacks suffered by practicing previously known techniques for fabricating BeO structures by providing an improved hot-pressing process wherein significant reductions in the cost of preparing theoretically dense or near theoretically dense, high-purity BeO structures are realized. In accordance with the method of the present invention, lithium oxide ($Li_2O$) is employed as a fugitive-type sintering aid with BeO powders of either the so-called "pressable" or "non-pressable" variety so as to promote rapid densification of the BeO at temperatures substantially lower than previously useable and to facilitate the fabrication of BeO structures by utilizing relatively inexpensive hot-pressing equipment such as a single-acting die.

An object of the present invention is to provide a new and improved method of fabricating structures of beryllium oxide in a substantially less expensive and more readily reproducible manner than heretofore available.

Another object of the present invention is to provide for the fabrication of beryllium oxide structures near or at theoretical density at significantly lower temperatures and pressures than previously useable while maintaining desired product purity.

A still further object of the present invention is to fabricate beryllium oxide structures by hot-pressing a mixture of beryllium oxide powder and a fluxing agent consisting of lithium oxide or a lithium compound which will decompose to lithium oxide when heated to a temperature less than about 950° C.

Other and further objects of the invention will be obvious upon an understanding of the illustrative process about to be described, or will be indicated in the appended claims, and various advantages not referred to herein will occur to one skilled in the art upon employment of the invention in practice.

The mixture of beryllium oxide powder and lithium oxide found suitable for providing structures of theoretical density or, if desired, near theoretical density, e.g., 95 percent or greater, consists of 99.5 weight percent beryllium oxide powder and 0.5 weight percent lithium oxide. This mixture is hot-pressed at a temperature less than 1000° C., preferably about 950° C., and a pressure less than about 2000 p.s.i., preferably about 1500 p.s.i. for a duration ranging from about 15 minutes for smaller structures, e.g., wafers of about 2 inches in diameter by 1 inch thick, to about 30 minutes for larger structures. In other words, the duration of the hot-pressing operation is dependent upon the mass of the structure.

The high degree of densification of the BeO structure obtained by hot-pressing at these relatively low temperatures and pressures is believed to be due to the formation of a small amount of liquid phase resulting from the interaction of $Li_2O$ and BeO to form a compound believed to be $Li_2BeO_2$ (an empirical formula for a compound not listed in the ASTM X-ray diffraction index and consequently identified as an unknown compound). The high degree of mobility promoted by this small amount of liquid phase causes the novel rapid densification of the BeO. Also, since the thermal stability of $Li_2BeO_2$ is apparently very poor above its melting point of less than 950° C., this compound acts as a fugitive-type flux or sintering aid for effecting and facilitating liquid phase sintering. Approximately 50 percent of the $Li_2O$ is lost during the hot-pressing operation and virtually all, if not all, of the remaining $Li_2O$ may be removed by sublimation with a subsequent, or prolonged, heating of the product at a temperature of about 1000°–1500° C. without decreasing the density of the beryllium oxide product.

While a specific quantity of $Li_2O$ in the $BeO-Li_2O$ mixture does not appear to be critical for the formation of the theoretically dense BeO products, it has been found that about 0.5 weight percent lithium oxide is satisfactory and that a greater quantity of lithium oxide adds very little, if anything, to the effectiveness of the process. With less than about 0.3 weight percent lithium oxide, the quantity of liquid phase present in the mixture may be insufficient to provide a product of theoretical density. The lithium oxide employed as the fugitive-type sintering aid may be provided by lithium oxide or by any other lithium compound capable of decomposing to lithium oxide when heated to a temperature less than 950° C. For example, lithium hydroxide (LiOH) or lithium carbonate ($Li_2CO_3$) have provided satisfactory results when mixed with the beryllium oxide in an amount or quantity equivalent to about 0.5 weight percent lithium oxide upon decomposition of the lithium compound. When using lithium hydroxide as a sintering aid, it may be desirable to employ a water vehicle for facilitating the admixture of the lithium hydroxide with the beryllium oxide. A quantity of water corresponding to 6–8 weight percent of the reaction mixture has been found to be satisfactory. This water is readily driven from the mixture during the hot-pressing operation.

Five different grades of commercially available beryllium oxide powders having average particle sizes ranging from 2 to 10 microns have been evaluated to determine the effects of $Li_2O$ as a liquid phase sintering aid for beryllium oxide powders considered to be hot-pressable as well as those considered to be non-hot-pressable, or at least highly difficult to hot-press. Commercial sources from which the pressable beryllium oxide were obtained recommended that the BeO powder be hot-pressed at a temperature in a range of 1470° to 1600° C. in order to obtain 95 percent of theoretical density. In addition to recommended temperatures, various sintering aids such as $Al_2O_3$, $SiO_2$, MgO, or a combination thereof were also suggested for achieving these high densities. To evaluate the advantage of $Li_2O$ as a liquid phase sintering aid, mixtures of each grade of BeO powder were prepared with LiOH and $Li_2CO_3$ in amounts equivalent to 0.5 weight percent $Li_2O$ and hot-pressed in single- and double-acting graphite dies at a temperature of 950° C. and at a pressure of 1500 to 2000 p.s.i. in an argon atmosphere. The densities attained for these experiments ranged from 2.92 grams per cubic centimeter (97 percent of theoretical density) to 3.00 grams per cubic centimeter (100 percent of theoretical density). Three of the five powders used were hot-pressed to densities of 99.5 to 100 percent of theoretical. The properties and characteristics of the beryllium oxide structure produced by the process of the present invention are illustrated in the following table.

TABLE

Density (gms./cc.)—2.98 to 3.00
Chemical assay—99.50 [a] BeO, .25 $Li_2O$, 99.90 [b] BeO, .0005 $Li_2O$
Hardness—61.5 Rockwell "A" scale
Flexure strength—33,100 p.s.i.
Flexure modulus of elasticity—4.9×10⁶
Tensile strength—10,000 p.s.i.
Tensile modulus of elasticity—52.4×10⁶

[a] Hot-pressed at 950–1000° C. and 2000 p.s.i.
[b] Hot-pressed at 950–1000° C. and 2000 p.s.i., post-heated at 1450° C.

As briefly mentioned above, the hot-pressing of the $BeO-Li_2O$ mixture may be readily accomplished in a simple graphite die assembly of the common single- or double-action type. The die is preferably provided with a natural-flake graphite core or layer for preventing or minimizing a reaction between the graphite die and the lithium oxide. The natural-flake graphite core may be held in place in any suitable manner such as by wetting the graphite die with a clear lacquer and then applying a layer of the graphite flakes to the wetted surface. The hot-pressing operation can be readily accomplished in a vacuum, inert atmosphere, or oxidizing atmosphere, depending on the particular die materials.

In order to provide a more facile understanding of the present invention, an example of a typical hot-pressing operation utilizing the novel lithium oxide sintering aid is set forth below. This example is merely illustrative and is not intended to limit the scope of the present invention, which is limited only by the scope of the appended claims.

EXAMPLE

A beryllium oxide product of 3.00 gms./cc. was prepared by admixing 1000 grams of a commercially available and "pressable" beryllium oxide powder of the desired purity with 8.13 grams lithium hydroxide in a twin-shell-type blender; loading the beryllium oxide-lithium hydroxide mixture in a graphite die assembly which had been coated with approximately 0.005 mil of natural-flake graphite bonded with a suitable plastic binder; placing the loaded graphite die assembly in an induction furnace; pressing the assembly at 100 p.s.i. to lock the die parts in place; purging the furnace with an inert gas to prevent oxidation of the graphite assembly; heating the loaded assembly to 950° C. at a rate of 700° C. per hour to produce $Li_2BeO_2$; pressing the mixture contained in the graphite die assembly to 1500 p.s.i.; maintaining a temperature of 950° C. and a pressure of 1500 p.s.i. for about 30 minutes; pushing the core assembly from the die after the pressure had been removed; cooling the assembly core and removing it from the furnace; and disassembling the die core and removing the beryllium oxide structure.

It will be seen that the present invention provides a new and highly advantageous approach to the fabrication of beryllium oxide components due to the significant reductions in the temperatures and pressures utilized in the hot-pressing operation. The rapid rate of densification and plastic creep rate after densification also make the use of lithium oxide as a sintering aid extremely advantageous for fabricating complicated shapes to desired density, including theoretical density, with much simpler die construction and process equipment than previously useable. Further, the method of the present invention permits the use of relatively large grain size powder since no precompaction of the powders is necessary for increasing the bulk density of the mixture prior to the hot-pressing operation. Additionally, the savings from the reduced cost of high-temperature equipment and electricity, the improved nuclear properties, and the use of so-called "non-pressable" powders, which result in a material cost saving of approximately 40 percent, are highly desirable features in the production of beryllium oxide structures.

As various changes may be made in the types of lithium compounds used for providing the $LiO_2$ sintering aid and in the arrangement of the method steps herein without departing from the spirit and scope of the invention and without sacrificing any of its advantages, it is to be understood that all matter herein is to be interpreted as illustrative and not in a limiting sense.

What is claimed is:
1. A method preparing a beryllium oxide product, comprising the steps of forming a mixture of beryllium oxide powder having an average particle size ranging from 2 to 10 microns and a sintering aid selected from the group consisting of lithium oxide and a lithium compound decomposable to lithium oxide when heated to a temperature less than about 950° C., said sintering aid being present in an amount sufficient to provide a concentration of at least 0.3% lithium oxide in said mixture, confining the mixture, heating the confined mixture to a temperature in the range of about 950° C. to about 1000° C. to cause a reaction between the beryllium oxide and the lithium oxide for forming a liquid phase compound of beryllium and lithium, stressing the heated mixture with a force corresponding to a pressure in the range of about 1500 to about 2000 p.s.i., and maintaining the mixture under said stress at a temperature of approximately the reaction temperature for a duration sufficient to affect the formation of a beryllium oxide product characterized by a density in a range between about 95 to 100 percent of theoretical density and a sintering aid content less than that in said mixture prior to the heating and stressing thereof.

2. The method of preparing a beryllium oxide product as claimed in claim 1, wherein each of the sintering aids as provided by the lithium oxide and the lithium compound when decomposed to lithium oxide is of a quantity corresponding to about 0.5 weight percent of the mixture.

3. The method of preparing a beryllium oxide product as claimed in claim 1, including the additional step of heating the product subsequent to said formation thereof at a temperature of at least about 950° C. for a period of time sufficient to sublime virtually the entire quantity of the sintering aid from said product.

4. The method of preparing a beryllium oxide product as claimed in claim 1, wherein the lithium compound decomposable to lithium oxide is lithium hydroxide contained in a water vehicle to facilitate the mixing of the lithium hydroxide with the beryllium oxide, and wherein the water vehicle is of a quantity corresponding to 6–8 weight percent of the mixture.

References Cited

UNITED STATES PATENTS

| 3,067,048 | 12/1962 | Gion et al. | 106—55 |
| 3,141,782 | 7/1964 | Livey et al. | 264—125 |
| 3,341,425 | 9/1967 | Chu | 106—55 |
| 3,226,456 | 12/1965 | Ryshkewitch et al. | 264—56 |
| 3,346,681 | 10/1967 | White et al. | 264—332 |

OTHER REFERENCES

J. E. Burke: "Progress in Ceramic Science," vol. 4, 1966, Pergamon Press, New York, pp. 100–101, 103, and 119.

JULIUS FROME, Primary Examiner

J. H. MILLER, Assistant Examiner

U.S. Cl. X.R.

106—55; 264—125, 332